Sept. 12, 1944.    M. W. CREW    2,357,878
PRESSURE CONTROL DEVICE
Filed Jan. 21, 1943    2 Sheets-Sheet 1

INVENTOR.
MORRIS W. CREW
BY Hyde and Meyer.
ATTORNEYS.

Sept. 12, 1944.  M. W. CREW  2,357,878
PRESSURE CONTROL DEVICE
Filed Jan. 21, 1943  2 Sheets-Sheet 2
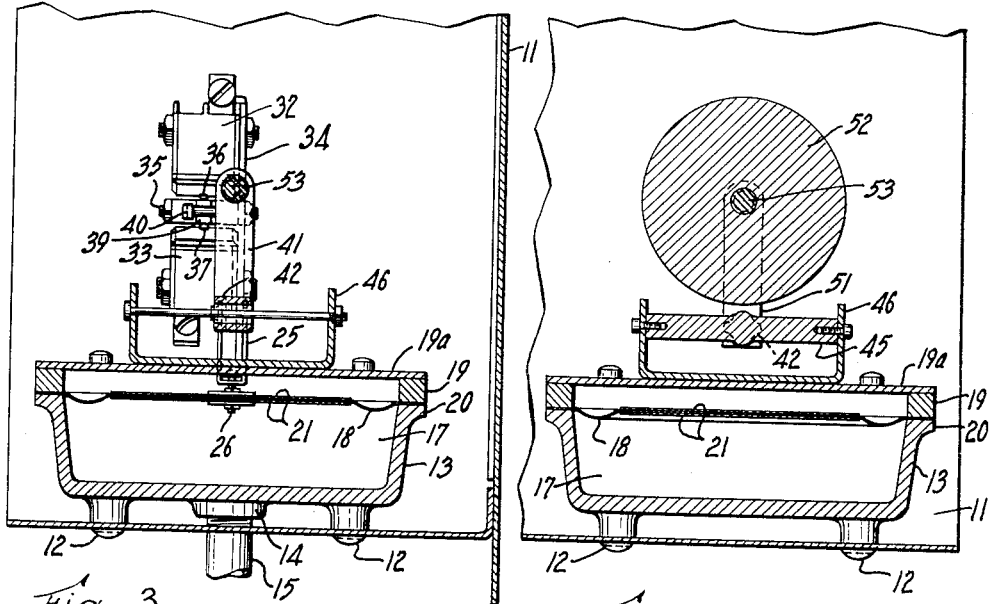
Fig.-3
Fig.-4
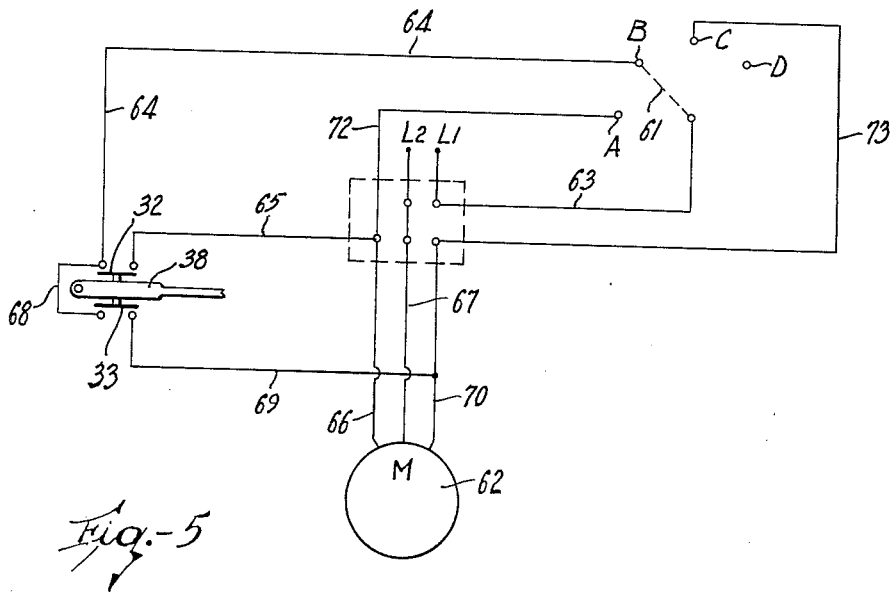
Fig.-5
INVENTOR.
MORRIS W. CREW
BY
Hyde and Meyer
ATTORNEYS.

Patented Sept. 12, 1944

2,357,878

UNITED STATES PATENT OFFICE 2,357,878

PRESSURE CONTROL DEVICE

Morris W. Crew, Cleveland, Ohio, assignor to The Hotstream Heater Company, Cleveland, Ohio, a corporation of Ohio Application January 21, 1943, Serial No. 473,085

5 Claims. (Cl. 200—83)

The invention relates to a novel and improved control device, sensitive to fluid pressure in a system and adapted to control said pressure.

One object of the invention is to provide pressure sensitive means, responsive to fluid pressures both below and above atmospheric and adapted to be readily and rapidly adjusted for the automatic control respectively of such negative or positive pressures.

A further object of the invention is to provide novel and improved means of the nature described for energizing further electrical control means to thereby control the pressure in the system.

In one specific embodiment of the invention, hereinafter described, the device is adapted to operate either from draft or from pressure above atmospheric. When so used it operates on minute differentials, responding instantaneously to variations in the motive pressure, but without hunting or over-running.

The device is of particular advantage in a fully automatic heating or steam producing unit wherein the rate of fuel and air feed is modulated, increased, or decreased in response to fluctuating boiler pressures.

It will accordingly be obvious to those skilled in the art that such a device is useful in many industrial applications. It may be used, for instance to control a boiler draft damper, fan pressure connected with the boiler, stoker speed, oil burner valves and the oil burner ports, speed of chain grate stokers or fuel bed control apparatus on other types of stokers. Any of these devices serve to increase or decrease steam pressure in a system so as to hold it at a predetermined point. My invention will be described in connection with such a system, it being understood that other applications are possible within the scope of the claims.

Figure 1:
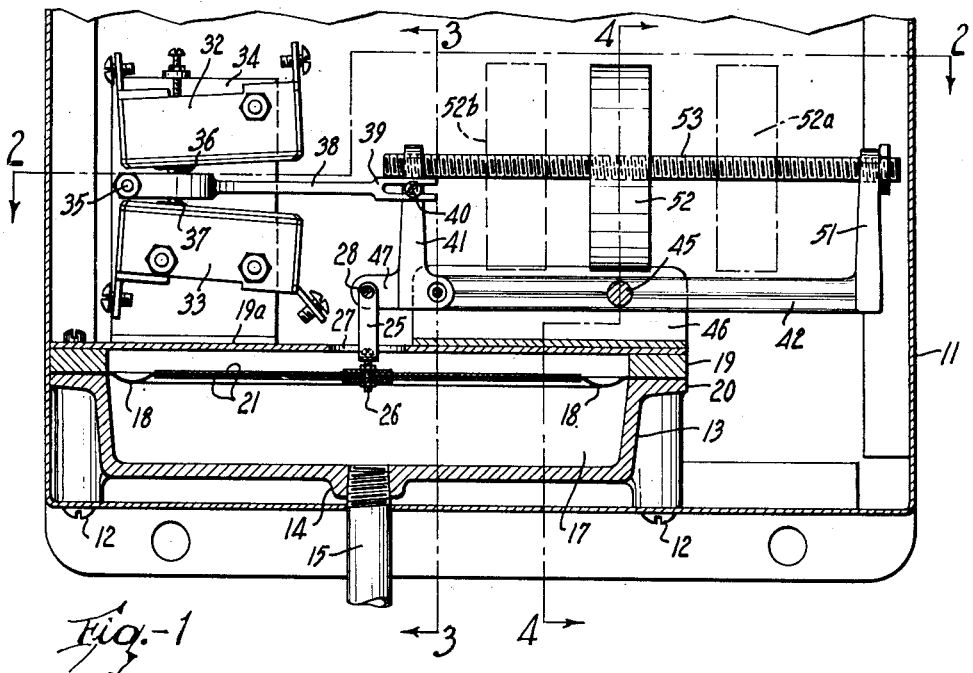
Figure 2:
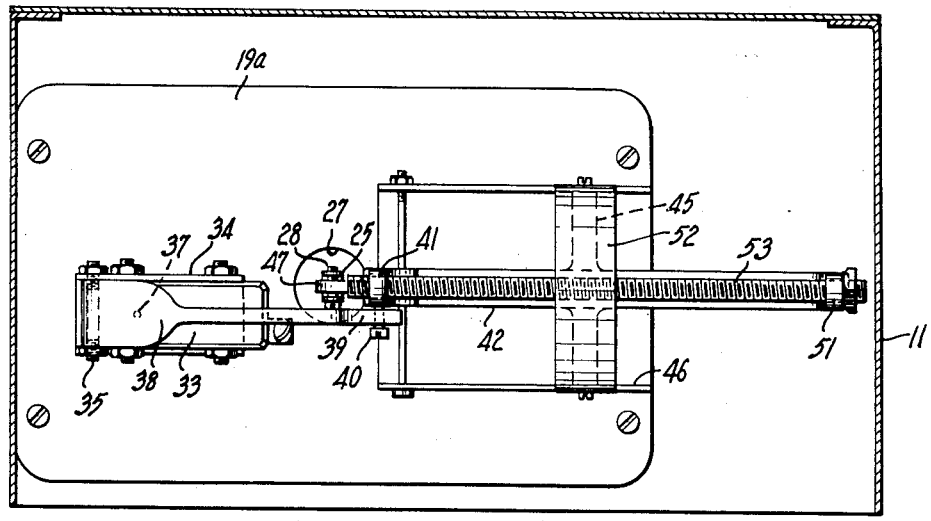

In the drawings accompanying this specification Fig. 1 is a front elevation, parts being broken away or shown in section, of one form of control device embodying this invention, lead wires being omitted; Fig. 2 is a sectional view taken on the line 2—2 of Fig. 1; Fig. 3 is a sectional view taken on the line 3—3 of Fig. 1; Fig. 4 is a sectional view taken on the line 4—4 of Fig. 1; and Fig. 5 is a wiring diagram of one adaptation of the apparatus.

Before the present invention is described in detail, it is to be understood that the invention here involved is not limited to the details of construction or the specific arrangement of parts herein illustrated or described as the invention obviously may take other forms. It also is to be understood that the phraseology or terminology herein employed is for the purpose of description and not of limitation, the scope of the present invention being indicated by the appended claims.

With special reference to Figs. 1 to 4, the apparatus to be now described is housed in a casing 11. Situated within said casing, and affixed thereto as by machine screws 12 or otherwise is a fluid pressure responsive means comprising a cup-like diaphragm chamber 13, provided on one of its rigid walls with a boss 14, suitably bored and threaded to receive a conduit 15 which is in communication with the fluid system to be controlled. In sealing relationship to the pressure space 17 is a flexible wall or diaphragm 18 which is secured around its peripheral edge in any suitable way, as by being retained between a cap portion 19 and a flange 20 on the cupped chamber 13, or in any other leakproof manner. The diaphragm may be flexible throughout, or may be centrally reinforced, as by thin metal plates 21. A link 25 projects through an aperture 27 in the cap 19. It is bifurcated, and carries a cross member or pivot pin 28, the function of which will appear as the description proceeds. The lower end of this bifurcated portion has a lost motion connection with the diaphragm by means of a headed stud 26 which is rigidly affixed to the diaphragm and is slidable to a limited degree in an aperture in the base of the bifurcated link 25.

I have provided extremely sensitive electrical control means responsive to minute changes in pressure in chamber 17. This means comprises a complementary pair of sensitive push button switches 32 and 33, usually termed Microswitches, mounted in opposed relationship on a bracket 34 which, for convenience is affixed on the top 19a of cap 19. Mounted on a pivot pin 35 carried by bracket 34, and freely movable so as to operate one or other of the push buttons 36 and 37 of respective switches 32 and 33 is an arm 38 having a bifurcated end 39, the two fingers of which retain therebetween a pin 40 affixed to an upright arm 41 on one end of a rocking beam 42. Said beam is pivotally mounted at 45 on a supporting bracket 46, and has a laterally extending lug 47 which is perforated to receive the pivot pin 28 on top of post 25 as already described. It is apparent from the above description that upward or downward movement of diaphragm 18 responsive to pressure variations in chamber 17 is transmitted through post 25, lug 47 and arm 41 of rocker 42, and switch arm 38 so as to operate either push button 36 or 37 and thereby institute corresponding changes in electrical control circuits in series with switches 32 and 33. The extent of lost motion in the connection of link 25 with stud 26 determines the sensitivity of response of switch lever 38 to changes in pressure in chamber 17.

It may be assumed for simplicity that the position of the parts shown in Fig. 1 represents a neutral point wherein the pressures above and below diaphragm 17 are in exact balance (or in other words the control is set for atmospheric pressure), and that under these conditions arm 38 does not operatively actuate either one of switch buttons 36 and 37. Since in the embodiment shown the switches are normally biased to open position, external electrical controls in circuit with one or other of the switches are not energized and the status quo in the pressure system is not disturbed.

If the pressure rises in chamber 17 the linkage between the diaphragm 18 and switch arm 38 effects closure of switch 32, and, conversely, any drop in pressure in chamber 17 results in closure of switch 33. Simple control means may be energized by either switch to restore the pressure to the desired value, so as to cause switch arm 38 to again assume a neutral position, as shown.

As will now appear, rocker 42 affords means whereby the device just described is readily and rapidly adaptable to the establishment of a neutral control point selectable from a wide range of pressure variations, either above or below atmospheric. Rocker 42 is equipped at opposite ends with posts or arms 41 and 51. Between said arms there extends track means adapted to receive and guide a balancing counterweight 52. In the present instance said track consists of a threaded rod 53 fixedly attached to arms 41 and 51. Counterweight 52 is likewise threaded so as to be laterally movable in either direction by simple rotation. In the full line position illustrated in Fig. 1 the counterweight is centered in the plane of the pivot 45 so as to balance the rocker for atmospheric pressure as described. If control is desired for a pressure other than atmospheric, such pressure is first built up in chamber 17 in any convenient manner, and at the desired point switch arm 38 is brought back to neutral position by movement of counterweight 52 to the left or right, whichever is necessary. As will be understood on consideration of the above description of the apparatus and its manner of operation, the device may be calibrated for the complete path of travel of counterweight 52 from one end of the track to the other so that thereafter a close approximation of the desired operating point may be achieved in advance, without the need of subsequent adjustment or check. Obviously, motion of the counterweight past the pivot and to the right to the broken line position 52a of Fig. 1 establishes an operating point which is below atmospheric, and, conversely, motion of the counterweight to the left to the broken line position 52b of Fig. 1 balances the system for operation at a pressure above atmospheric.

Fig. 5 shows a simple wiring diagram of my pressure control device wherein a reversible electric motor 62 is energized to operate further mechanism (not indicated) for modulating the pressure, when necessary, to maintain equilibrium in the pressure system. It will be understood of course that this is only one of the many ways in which the device can be put to use.

The diagram includes a simple rotary switch lever 61 having three active positions A, B, and C, and an off or dead position D. With switch lever 61 in the B position the device is set for automatic control. If switch arm 38 is moved upwardly by increase in pressure in the chamber 17 so as to close the contact points of switch 32, motor 62 will be energized for rotation in one direction by current proceeding as follows; from line $L_1$ through conductor 63, switch lever 61 in B position, conductor 64, closed switch 32, conductor 65, conductor 66, windings of motor 62 and conductor 67 to $L_2$. The motor may be reversed by a pressure drop, and consequent closure of switch 33 as follows; current proceeds from line $L_1$ through conductor 63, switch lever 61 in B position, conductor 64, conductor 68, closed switch 33, conductor 69, conductor 70, windings of motor 62, and conductor 67 to $L_2$.

Although the device controls satisfactorily when thus set, I have provided two further switch positions, A and C, whereby the motor may be operated in one direction or the other for any desired period, independent of the automatic control. When switch lever 61 is in the A position the motor is energized as follows; from line $L_1$ through conductor 63, lever 61 in A position, conductor 72, conductor 66, windings of motor 62, and conductor 67 to $L_2$, so as to bypass switches 32 and 33 and produce continuous rotation of motor 62 in one direction. Rotation in the opposite direction is instituted by moving switch lever 61 to the C position, causing the current to flow as follows: from $L_1$ through conductor 63, switch lever 61 in C position, conductor 73, conductor 70, windings of motor 62, conductor 67 to $L_2$.

When the motor operates as just described, the switch lever being in either the A or the C position, a limit switch (not shown) may be provided to control its range of operation in both directions, in manner well known to the art.

As will be apparent to those skilled in the art on consideration of the disclosure hereinabove, other electrical circuits and arrangements for controls of varying natures can readily be adapted to a pressure responsive system such as I have described.

What I claim is:

1. In a controller of the class described, pressure susceptible means having an element movable in response to fluid pressure fluctuations in a system, control means having an active and an inactive position with respect to the energization of further apparatus in the system, operating connections between said pressure susceptible means and said control means, said control means being thereby sensitive to variation in position of said pressure responsive element so as to be thereby movable either to said active or inactive position, said connections including a pivoted member, and counterweight means adjustably movable to either side of the pivot of said member and operatively associated with said pressure susceptible means, whereby said inactive position may be predetermined to correspond to any desired pressure value by adjustment of said counterweight in either direction with respect to said pivot.

2. In a controller of the class described, pressure susceptible means having an element movable in response to fluid pressure fluctuations in a system, control means having active and inactive positions with respect to the energization of further apparatus in the system, said control means comprising a pair of spaced, opposed electric switches, switch actuating means movably mounted between said switches, operating connections from said switch actuating means to said movable, pressure responsive element, and sensitive to movement thereof so as to be thereby movable past a neutral point between said switches, said connections including a pivoted member, and counterweight means adjustably movable to either side of the pivot of said member and operatively associated with said pressure susceptible means, whereby said neutral point may be predetermined to correspond to any desired pressure value by adjustment of said counterweight in either direction with respect to said pivot.

3. In a controller of the class described, fluid pressure responsive means comprising a walled chamber in communication with a source of fluid pressure in a system, one wall of said chamber being movable in response to fluctuations in pressure in said system, control means comprising a pair of spaced, opposed electric switches, switch actuating means movably mounted between said switches and operatively linked with said movable wall so as to be thereby movable past a neutral point between said switches to an actuating position with respect to one or other of said switches, counterweight supporting means, a pivot for said supporting means, a counterweight carried on said supporting means and movable across said pivot to one or other side thereof, said counterweight supporting means being operatively associated with said movable wall whereby said neutral point may be predetermined to correspond to any desired fluid pressure value by adjustment of the position of said counterweight with respect to said pivotal point.

4. In a controller of the class described, pressure susceptible means having an element movable in response to fluid pressure fluctuations in a system, control means comprising a pair of spaced, opposed electric switches, an operating member for said switches having an active position with respect to each switch and a neutral position intermediate said active positions for the energization of further apparatus in the system, actuating linkage operatively connecting said operating member with said movable, pressure responsive element, including a device which rocks about a pivotal axis, said operating member being sensitive to movement thereof so as to be thereby movable past said neutral point between said switches to one or other of said active positions, and counterweight means on said devices adjustably movable to either side of said pivotal axis, whereby said neutral point may be predetermined to correspond to any desired pressure value by adjustment of said counterweight in either direction with respect to said pivotal axis.

5. In a controller of the class described, pressure susceptible means having an element movable in response to fluid pressure fluctuations in a system, control means comprising a pair of spaced, opposed electric switches, an operating member for said switches having an active position with respect to each switch and a neutral position intermediate said active positions for the energization of further apparatus in the system, actuating linkage operatively connecting said operating member with said movable, pressure responsive element, including a device which rocks about a pivotal axis, said operating member being sensitive to movement thereof so as to be thereby movable past said neutral point between said switches to one or other of said active positions, said linkage including a lost motion connection, and counterweight means adjustably movable to either side of said pivotal axis, whereby said neutral point may be predetermined to correspond to any desired pressure value by adjustment of said counterweight in either direction with respect to said pivotal axis.

MORRIS W. CREW.